US012790542B2

(12) United States Patent
Sharbirin et al.

(10) Patent No.: US 12,790,542 B2
(45) Date of Patent: Nov. 10, 2026

(54) NITRIDE-BASED MXENE LIGHT-EMITTING QUANTUM DOT AND METHOD OF MANUFACTURING THE SAME

(71) Applicant: RESEARCH & BUSINESS FOUNDATION SUNGKYUNKWAN UNIVERSITY, Suwon-si (KR)

(72) Inventors: Anir S. Sharbirin, Suwon-si (KR); Jeongyong Kim, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 777 days.

(21) Appl. No.: 18/137,562

(22) Filed: Apr. 21, 2023

(65) Prior Publication Data

US 2024/0124772 A1 Apr. 18, 2024

(30) Foreign Application Priority Data

Apr. 25, 2022 (KR) ........................ 10-2022-0050999

(51) Int. Cl.
*C09K 11/67* (2006.01)
*C09K 11/08* (2006.01)

(52) U.S. Cl.
CPC .......... *C09K 11/67* (2013.01); *C09K 11/0883* (2013.01); *C09K 2211/183* (2013.01)

(58) Field of Classification Search
CPC ................ C09K 11/67; C09K 11/0883; C09K 2211/183
USPC .................................................. 252/301.4 R
See application file for complete search history.

(56) References Cited

PUBLICATIONS

Sharbirin, Anir S., et al. "Light-emitting $Ti_2N$ (MXene) quantum dots: synthesis, characterization and theoretical calculations." *Journal of Materials Chemistry C* vol. 10. Issue 16 (2022). pp. 6508-6514.

Akhtar, Sophia, et al. "Low temperature step annealing synthesis of the $Ti_2AlN$ MAX phase to fabricate MXene quantum dots." *Applied Sciences* vol. 12. Issue 9 (2022): 4154. pp. 1-11.

Djire, Abdoulaye, et al. "Electrocatalytic and Optoelectronic Characteristics of the Two-Dimensional Titanium Nitride $Ti_4N_3T_x$ MXene." ACS applied materials & interfaces 11.12 (2019): 11812-11823.

Sharbirin, Anir S., et al., "Light-emitting MXene quantum dots." Opto-Electronic Advances 4.3 (2021): 200077-1., (20 pages).

Korean Office Action issued on Mar. 15, 2024, in counterpart Korean Patent Application No. 10-2022-0050999 (5 pages in English, 5 pages in Korean).

*Primary Examiner* — Anita Nassiri-Motlagh
(74) *Attorney, Agent, or Firm* — LEX IP MEISTER, PLLC

(57) ABSTRACT

There are provided a nitride-based MXene light-emitting quantum dot and a method of manufacturing the same. The nitride-based MXene light-emitting quantum dot includes a nitride-based MXene quantum dot having a diameter of 10 nm or less and absorbs ultraviolet light to emit light, and the nitride-based MXene light-emitting quantum dot has an effect of efficiently generating light emission by increasing bandgap energy of MXene by inducing a quantum confinement effect by reducing the size of the quantum dot.

10 Claims, 5 Drawing Sheets

NITRIDE-BASED MXENE LIGHT-EMITTING QUANTUM DOT AND METHOD OF MANUFACTURING THE SAME

CROSS REFERENCE TO RELATED APPLICATION

The present application claims priority to Korean Patent Application No. 10-2022-0050999, filed Apr. 25, 2022, the entire contents of which are incorporated herein for all purposes by this reference.

BACKGROUND OF THE INVENTION

Field of the Invention

The present invention relates to a nitride-based MXene light-emitting quantum dot and a method of manufacturing the same, and more particularly, to a technique for manufacturing a nitride-based MXene light-emitting quantum dot by decomposing nitride-based MAX phase into nanoparticles.

Description of the Related Art

A MAX phase (wherein M is a transition metal, A is a Group 13 or 14 element, and X is carbon and/or nitrogen) is known as one of the two-dimensional materials having a structure similar to that of graphene, and the MAX phase is also known for its excellent physical properties, such as electrical conductivity, excellent oxidation resistance, and excellent machinability.

Recently, a two-dimensional material called "MXene" was introduced by transforming a three-dimensional titanium-aluminum carbide of a MAX phase into a two-dimensional structure having completely different characteristics by selectively removing an aluminum layer corresponding to A from the three-dimensional titanium-aluminum carbide of the MAX phase by using a strong acid, such as hydrofluoric acid.

MXene has electrical conductivity and strength similar to those of graphene, and due to these characteristics, there are attempts to apply MXene in various fields, such as electromagnetic shielding, electrochemical energy storage, gas sensors, or biosensors.

In addition, the MXene is attracting attention as a material that has metallic properties (electrical conductivity) due to a transition metal and is simultaneously hydrophilic due to a hydroxyl (OH—) group, fluorine (F—) group or oxygen (O—) group surface-terminating functional group thereof.

However, since the MXene is a crystalline material and thus does not have a bandgap of a semiconductor, it is difficult to use the MXene as a light-emitting material. In the form of a bulk, which is mostly a crystalline solid material, electron energy levels appear in bands (energy bands), and thus, light absorbed or emitted by an optical action appears in a wide range of wavelength.

As the size of the crystalline solid decreases, the energy level becomes extremely narrow, and when the size reaches a nanoscale, a "quantized" quantum dot is obtained in which there has been a change into a single energy level (rather than a band) like a molecule.

The size, shape, and chemical composition of the quantum dot may be controlled to widely change a bandgap from the visible ray region to the ultraviolet and infrared regions.

In addition, the emission bandwidth is much narrower than that of other phosphors, resulting in excellent color purity, and thus, quantum dots are considered significantly promising as a next-generation display and a light source for lighting.

Accordingly, recently, MXene quantum dots that have excellent electrical conductivity and excellent strength of the MXene and exhibit a luminous effect have been developed.

So far, various types of MXene, such as carbide, nitride, and carbonized MXene, have been developed as MXene quantum dots, but as for MXene light-emitting quantum dots, mostly carbide-based MXene light-emitting quantum dots have been reported.

Therefore, there are still many challenges to manufacturing nitride-based MXene light-emitting quantum dots that are expected to exhibit a luminous effect while having excellent characteristics in terms of electrical conductivity.

DOCUMENTS OF RELATED ART (Patent Document 1) Korean Registration Patent No. 10-2108832

SUMMARY OF THE INVENTION

A technical object to be achieved by the present invention is to provide a nitride-based MXene light-emitting quantum dot and a method of manufacturing the same, wherein the nitride-based MXene light-emitting quantum dot includes a nitride-based MXene quantum dot having a diameter of 10 nm or less and absorbs ultraviolet light to emit light.

The technical object to be achieved by the present invention is not limited to the above-described technical object, and other technical objects that are not mentioned will be clearly understood by those of skilled in the art from the following description.

To accomplish the above object, according to one aspect of the present invention, there is provided a nitride-based MXene light-emitting quantum dot.

The nitride-based MXene light-emitting quantum dot according to an embodiment of the present invention may include a nitride-based MXene quantum dot having a diameter of 10 nm or less and absorb ultraviolet light to emit light.

According to an embodiment of the present invention, a wavelength of the ultraviolet light may be 230 nm to 400 nm.

According to an embodiment of the present invention, the nitride-based MXene light-emitting quantum dot may be water-soluble.

According to an embodiment of the present invention, the nitride-based MXene quantum dot may include titanium nitride ($Ti_2N$), vanadium nitride ($V_2N$), or niobium nitride ($Nb_2N$).

To accomplish the above object, according to another aspect of the present invention, there is provided a method of manufacturing a nitride-based MXene light-emitting quantum dot.

A method of manufacturing the nitride-based MXene light-emitting quantum dot according to an embodiment may include: manufacturing a nitride-based MXene by treating a nitride-based MAX phase with an acidic solution; delaminating the nitride-based MXene through ultrasonic treatment; and synthesizing the nitride-based MXene light-emitting quantum dot by performing hydrothermal synthesis on the delaminated nitride-based MXene.

According to an embodiment of the present invention, in the manufacturing of the nitride-based MXene, the nitride-based MXene may be manufactured by treating the nitride-based MAX phase with the acidic solution.

According to an embodiment of the present invention, in the manufacturing of the nitride-based MXene, the acidic solution may include fluoride salts such as LiF, KF or NaF.

According to an embodiment of the present invention, in the delaminating of the nitride-based MXene, the ultrasonic treatment may be performed at a frequency of 30 kHz to 60 kHz.

According to an embodiment of the present invention, the ultrasonic treatment may be performed at a temperature of 30° C. to 50° C.

According to an embodiment of the present invention, in the synthesizing of the nitride-based MXene light-emitting quantum dot, the hydrothermal synthesis may be performed at a temperature of 100° C. to 180° C.

According to an embodiment of the present invention, in the synthesizing of the nitride-based MXene light-emitting quantum dot, the hydrothermal synthesis may be performed at a pressure of $10^{-2}$ Torr to $10^{-4}$ Torr.

DETAILED DESCRIPTION OF THE INVENTION

Figure 1:
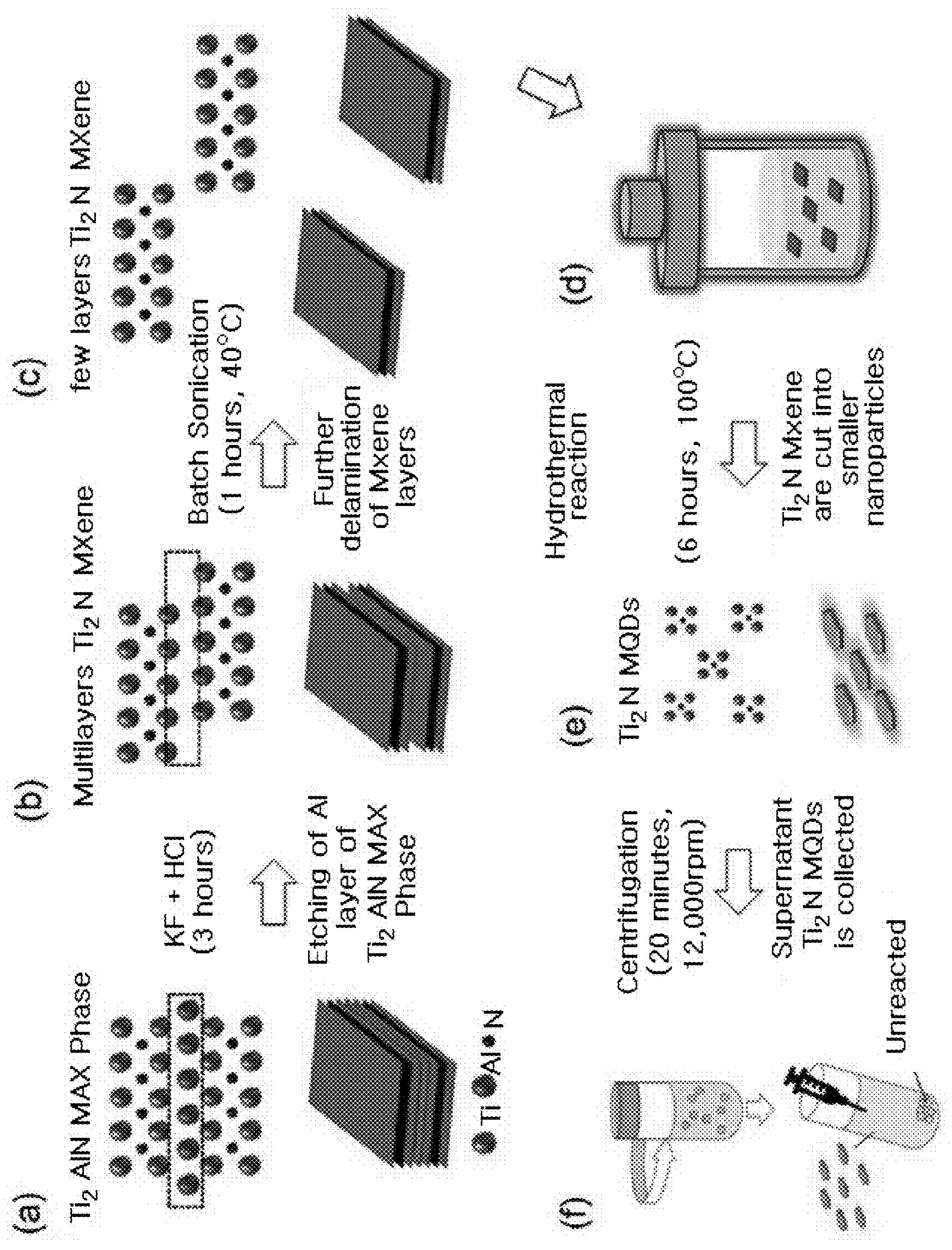
FIG. 1 is a schematic diagram showing a method of manufacturing a nitride-based MXene quantum dot, according to an embodiment of the present invention.

Hereinafter, the present invention will be described with reference to the accompanying drawings. However, the present invention may be implemented in various forms, and thus is not limited to the embodiments described herein. In addition, in the drawings, parts irrelevant to the description of the present invention are omitted in order to clearly explain the present invention, and like numerals are used to refer to like elements throughout the specification.

Throughout the specification, when a part is connected (accessed, contacted, or coupled) with other parts, it includes direct connection as well as indirect connection in which the other member is positioned between the parts. In addition, when a part includes other elements, unless explicitly described to the contrary, the word "include" or "comprise", such as "includes", "including", "comprises", or "comprising", will be understood to imply the inclusion of stated elements rather than the exclusion of any other elements.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Hereinafter, a nitride-based MXene light-emitting quantum dot and a method of manufacturing the same, according to an embodiment of the present invention, will be described in detail.

The nitride-based MXene light-emitting quantum dot according to an embodiment of the present invention will be described in detail.

The nitride-based MXene light-emitting quantum dot according to an embodiment of the present invention may include a nitride-based MXene quantum dot having a diameter of 10 nm or less and may absorb ultraviolet light to emit light.

The ultraviolet light may have a wavelength of 230 nm to 400 nm.

The nitride-based MXene light-emitting quantum dot may be water-soluble.

The nitride-based MXene quantum dot may include titanium nitride ($Ti_2N$), vanadium nitride ($V_2N$), or niobium nitride ($Nb_2N$).

MXene is a material that has a chemical composition including a transition metal and nitrogen or carbon, or both nitrogen and carbon and has a two-dimensional molecule in the form of a plane, and is attracting attention as a unique material that has excellent electrical conductivity and is simultaneously hydrophilic due to a hydroxyl (OH—) group, fluorine (F—) group or oxygen (O—) group as surface-terminating functional group thereof.

However, since the MXene is a metallic material and thus does not have a bandgap of a semiconductor, the MXene may not be used as a light-emitting material.

Therefore, when the MXene is cut to a nanometer size, the movement of electrons is spatially limited, and unique characteristics that have not been found in a larger size may appear due to a quantum mechanical phenomenon.

Likewise, the MXene quantum dot (QD) obtained by being cut to a nanometer size represents a semiconductor nanoparticle of which the energy bandgap varies depending on the size.

Particularly, when the size of the quantum dot becomes smaller than the radius of an exciton (exciton: a combination of electron and hole), the energy level is quantized by a quantum confinement effect, and as the particle size decreases, the energy bandgap may increase.

The quantum confinement effect is a phenomenon in which electrons form a discontinuous energy state by the space wall when the size of the particles is tens of nanometers or less, and as the size of the space decreases, the energy state of the electrons becomes higher and has a wide energy band.

The quantum dot is a crystal of a semiconductor, and when light is incident on nanoparticles, the light meets nanoparticles of different sizes to achieve light emission of a specific wavelength.

In other words, when the size of the quantum dot decreases, the bandgap widens, resulting in a purple color, and when the size of the quantum dot increases, the bandgap narrows, resulting in a red color.

The nitride-based MXene light-emitting quantum dot according to an embodiment of the present invention has a diameter of 10 nm or less, and may emit light of different colors depending on the size of the nitride-based MXene light-emitting quantum dot when a wavelength of the ultraviolet light is 230 nm to 400 nm.

When a MXene light-emitting quantum dot according to an embodiment of the present invention includes a nitride-based MXene light-emitting quantum dot, electrical conductivity and stability in a solution may be better than when the MXene light-emitting quantum dot includes a carbide-based MXene light-emitting quantum dot.

Since the carbide-based MXene light-emitting quantum dot is not detectable due to weak photoluminescence (PL) at illumination with less than 300 nm of light wavelength, the nitride-based MXene light-emitting quantum dot may absorb ultraviolet (UV) light in a wider range than the carbide-based MXene light-emitting quantum dot.

The reason why the nitride-based MXene is cut such that the size of the nitride-based MXene light-emitting quantum dot is 10 nm or less is that the size at which light emission by a quantum effect is achievable is 10 nm.

In addition, the nitride-based MXene light-emitting quantum dot may include titanium nitride ($Ti_2N$), vanadium nitride ($V_2N$), or niobium nitride ($Nb_2N$).

The nitride-based MXene light-emitting quantum dot including titanium nitride ($Ti_2N$), vanadium nitride ($V_2N$), or niobium nitride ($Nb_2N$) may be superior to other elements in absorbing ultraviolet (UV) light due to its high electrical conductivity, and thus may be more efficient in emitting light.

Specific ultraviolet light absorption and photoluminescence characteristics of the nitride-based MXene light-emitting quantum dot will be described below in the following Experimental Example.

Referring to FIG. 1, a method of manufacturing a nitride-based MXene light-emitting quantum dot according to another embodiment of the present invention will be described in detail.

Figure 2:
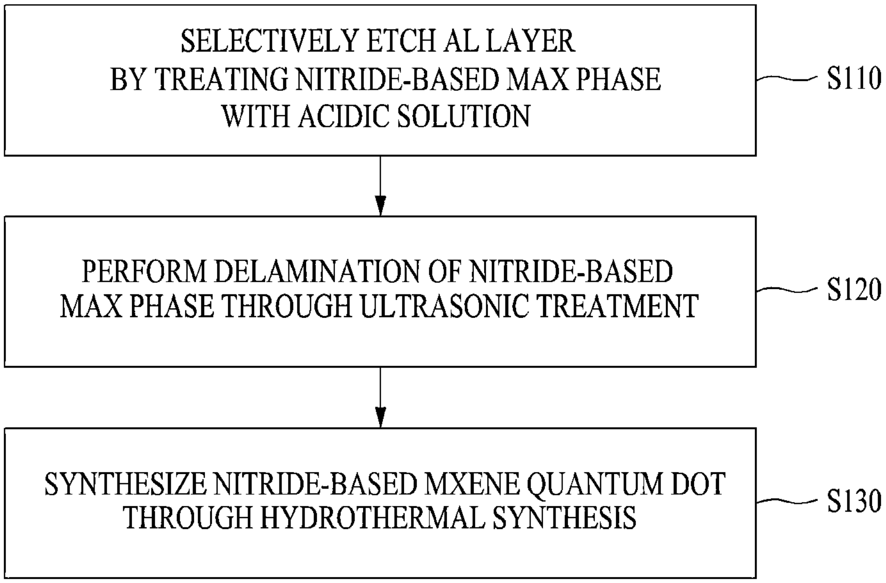
FIG. 2 is a flowchart showing a method of manufacturing a nitride-based MXene quantum dot, according to an embodiment of the present invention.

FIG. 2 is a flowchart showing a method of manufacturing a nitride-based MXene quantum dot, according to an embodiment of the present invention.

The method of manufacturing the nitride-based MXene light-emitting quantum dot includes: manufacturing a nitride-based MXene by treating a nitride-based MAX phase with an acidic solution (S100); delaminating the nitride-based MXene through ultrasonic treatment (S200); and synthesizing the nitride-based MXene light-emitting quantum dot by performing hydrothermal synthesis on the delaminated nitride-based MXene (S300).

The first step includes manufacturing the nitride-based MXene by treating the nitride-based MAX phase with the acidic solution. (S100)

The nitride-based MXene may be manufactured by treating the nitride-based MAX phase with the acidic solution.

The MAX phase is called MAX according to the form of a chemical formula of Mn+1AXn of a material, wherein M is a transition metal, A is a Group 13 or 14 element, and X is carbon or nitrogen or both carbon and nitrogen.

For example, M may include Ti, V, Cr, Zr, Nb, Mo, Hf, Ta, or Sc.

For example, A may include Al, Si, P, S, Ga, Ge, As, Cd, In, Sn, Tl, or Pb.

The MAX phase has a layered structure, and although the MAX phase is a ceramic material, the MAX phase is ductile and thus mechanically processable and has excellent thermal and electrical conductivity.

In an embodiment of the present invention, the nitride-based MAX phase may include $Ti_2AlN$, $V_2AlN$, or $Nb_2AlN$.

When the nitride-based MAX phase is treated with the acidic solution, an Al element layer may be selectively etched, and a method of selectively etching the Al element layer may include: preparing an acidic solution by mixing HCl and KF powder; and manufacturing a nitride-based MXene including $Ti_2N$ by applying the acidic solution to $Ti_2AlN$ MAX phase powder, leaving it at room temperature for 3 hours, and then performing ultrasonic treatment to selectively etch the Al layer.

The acidic solution may include HCl, HF, or $NH_4HF_2$, and may further include one or more selected from LiF, NaF and KF, but is not limited the above-described acid materials.

The acidic solution further includes LiF, NaF or KF because it may be helpful in further delaminating a MXene layer in a subsequent ultrasonic treatment process and preventing re-stacking during etching.

For example, a nitride-based MXene sheet having a two-dimensional planar structure similar to that of graphene may be manufactured by selectively etching the Al element layer in the nitride-based MAX phase.

Since the nitride-based MXene sheet having a two-dimensional planar structure similar to that of graphene, formed by selectively etching the Al element layer in the nitride-based MAX phase, is a multilayer structure, it is important to dismantle the multilayer structure in order to efficiently manufacture a quantum dot.

The second step includes delaminating the nitride-based MXene through ultrasonic treatment. (S200)

Referring to FIG. 1, when the Al element layer is selectively etched in the nitride-based MAX phase, $Ti_2N$ MXene having a multilayer structure may be manufactured.

The multilayer $Ti_2N$ MXene in which the Al element layer is not etched may have a problem in which an Al element remains when a nitride-based MXene light-emitting quantum dot is manufactured.

Therefore, when the nitride-based MAX phase is subjected to ultrasonic treatment and washed, $Ti_2N$ MXene having a single-layered structure may be manufactured by delaminating each layer.

An ultrasonic treatment method is selected from among methods of separating the multilayer because ultrasonic treatment with the presence of $Li^+$, $Na^+$ or $K^+$ in LiF, NaF or KF has the advantage of facilitating delamination.

In an embodiment of the present invention, the ultrasonic treatment is performed at a frequency of 30 kHz to 60 kHz.

When the ultrasonic treatment is performed at 30 kHz or less, there may be a problem in that MXene is not sufficiently delaminated, and when the ultrasonic treatment is performed at 60 kHz or more, there may be problem in that MXene may be damaged.

In an embodiment of the present invention, the ultrasonic treatment may be performed at a temperature of 30° C. to 50° C. for 30 minutes to 2 hours.

When the ultrasonic treatment is performed at a temperature of 30° C. or less, there may be a problem in that MXene is not sufficiently delaminated, and when the ultrasonic treatment is performed at a temperature of 50° C. or more, there may be a problem in that MXene may be damaged.

In addition, when the ultrasonic treatment is performed for 30 minutes or less, there may be a problem in that MXene is not sufficiently delaminated, and when the ultrasonic treatment is performed for 2 hours or more, there may be a problem in that MXene may be damaged.

A specific method of delamination by ultrasonic treatment is as follows.

The method may include: performing ultrasonic treatment for an hour by heating a solution containing $Ti_2N$ having a multilayer structure at 40° C.; and washing a suspension of the nitride-based MXene several times by using deionized water, performing centrifugation (12,000 rpm) for 20 minutes to remove soluble fluoride until the pH approaches 6, and finally preparing $Ti_2N$ MXene powder.

The third step includes synthesizing the nitride-based MXene light-emitting quantum dot by performing hydrothermal synthesis on the delaminated nitride-based MXene. (S300)

The hydrothermal synthesis is one of various methods to crystallize a material from a high-temperature aqueous solution at high atmospheric pressure, and is a single-crystal synthesis method that depends on solubility. The crystal growth is carried out in an apparatus including a steel pressure vessel called an autoclave.

A specific example of the hydrothermal synthesis according to an embodiment of the present invention is as follows.

The hydrothermal synthesis may include: putting and dispersing the $Ti_2N$ MXene powder in deionized water and putting the mixed solution into a Teflon-lined stainless steel autoclave; slowly adding ammonium hydroxide ($NH_4OH$) until the pH of the solution reaches 10; by performing hydrothermal synthesis on the autoclave in a vacuum oven at 100° C. for 6 hours; collecting a titanium nitride ($Ti_2N$) MXene quantum dot supernatant by performing centrifugation (10,000 rpm) on the produced mixture for 20 minutes; and by vacuum filtering the obtained titanium nitride ($Ti_2N$) MXene quantum dot to remove the remaining MXene completely to manufacture titanium nitride ($Ti_2N$) MXene quantum dots having a diameter of 10 nm or less.

Since the titanium nitride MXene quantum dot according to an embodiment of the present invention is manufactured by hydrothermal synthesis, there may be an effect of obtaining a smaller-sized quantum dot.

In a method of manufacturing a quantum dot through the hydrothermal synthesis, sufficient thermal energy is supplied to MXene during a hydrothermal synthesis process, and thus, the MXene is cut to a size of 10 nm or less to become a quantum dot.

In a method of manufacturing a nitride-based MXene quantum dot through the hydrothermal synthesis, control factors may be temperature, pressure, and reaction time, and when the conditions are controlled, a nitride-based MXene may be cut to a size of 10 nm or less.

The method of manufacturing the nitride-based MXene quantum dot through the hydrothermal synthesis may be performed at a temperature of 100° C. to 180° C.

When the hydrothermal synthesis is performed at a temperature of 100° C. or less, there may be a problem in that MXene is not sufficiently broken into small pieces, and when the hydrothermal synthesis is performed at a temperature of 180° C. or more, there may be a problem in that MXene may be damaged.

In addition, the method of manufacturing the nitride-based MXene quantum dot through the hydrothermal synthesis may be performed at a pressure of $10^{-2}$ Torr to $10^{-4}$ Torr.

When the hydrothermal synthesis is performed at a pressure of $10^{-2}$ Torr or less, there may be a problem in that MXene is not sufficiently broken into small pieces, and when the hydrothermal synthesis is performed at a pressure of $10^{-4}$ Torr or more, there may be a problem in that MXene may be damaged.

The nitride-based MXene light-emitting quantum dot is obtained through the hydrothermal synthesis, there may be an effect of obtaining a quantum dot having excellent crystallinity and a small size, and even when the hydrothermal synthesis is performed under the above-described temperature and pressure conditions, there may be an effect of obtaining a quantum dot having excellent crystallinity and a small size.

Ammonium hydroxide ($NH_4OH$) is slowly added until the pH of the solution reaches 10 because it may be helpful in maintaining a pure MXene crystal structure as a low reaction temperature of the solution and a —NH group prevent the formation of $TiO_2$ or a $TiO_2$ quantum dot.

Likewise, the method of manufacturing the nitride-based MXene light-emitting quantum dot according to an embodiment of the present invention has an effect of efficiently generating light emission by manufacturing MXene as a MXene quantum dot having a diameter of 10 nm or less to increase the bandgap energy of the MXene.

In addition, the nitride-based MXene light-emitting quantum dot according to an embodiment of the present invention may emit strong light with a maximum quantum yield of 11.8%.

In addition, the nitride-based MXene light-emitting quantum dot according to an embodiment of the present invention has the effect of exhibiting an efficient photoluminescence spectrum for light absorption in a wide ultraviolet wavelength range.

Preparation Example

Referring to FIG. 1, a method of manufacturing a nitride-based MXene light-emitting quantum dot according to an embodiment of the present invention will be described.

FIG. 1 is an exemplary view showing a method of manufacturing a nitride-based MXene quantum dot, according to an embodiment of the present invention.

First, an acidic solution was prepared by mixing 100 ml of 6M HCl and 6 g of KF powder in order to etch an Al layer in a $Ti_2AlN$ MAX phase.

Next, 20 ml of the acidic solution was added to $Ti_2AlN$ MAX phase powder and then left at room temperature for 3 hours to selectively etch the Al layer, thereby manufacturing a nitride-based MXene including $Ti_2N$ and having a multilayer. (See (a) of FIG. 1)

Next, the multilayer nitride-based MXene in which the Al layer was selectively etched was heated at 40° C. and ultrasonicated for an hour so as to be delaminated. (see (b) of FIG. 1)

Next, a suspension of the nitride-based MXene was washed several times by using deionized water and subjected to centrifugation (12,000 rpm) for 20 minutes to remove soluble fluoride until the pH approached 6, and finally, $Ti_2N$ MXene powder was obtained. (see (c) of FIG. 1)

Next, 1.1 g of the $Ti_2N$ MXene powder was put and dispersed in 10 ml of deionized water, and the mixed solution was put into 50 ml of a Teflon-lined stainless steel autoclave. (see (d) of FIG. 1)

Next, ammonium hydroxide ($NH_4OH$) was slowly added until the pH of the solution reached 10.

Next, the autoclave was subjected to hydrothermal synthesis in a vacuum oven at 100° C. for 6 hours to produce a mixture. (see (e) of FIG. 1)

Next, the produced mixture was subjected to centrifugation (10,000 rpm) for 20 minutes to collect titanium nitride ($Ti_2N$) MXene quantum dots from the supernatant.

Next, the obtained titanium nitride ($Ti_2N$) MXene quantum dot was subjected to vacuum filtration to completely remove the remaining MXene, thereby manufacturing a titanium nitride ($Ti_2N$) MXene quantum dot having a diameter of 3 nm.

Experimental Example

Figure 3:
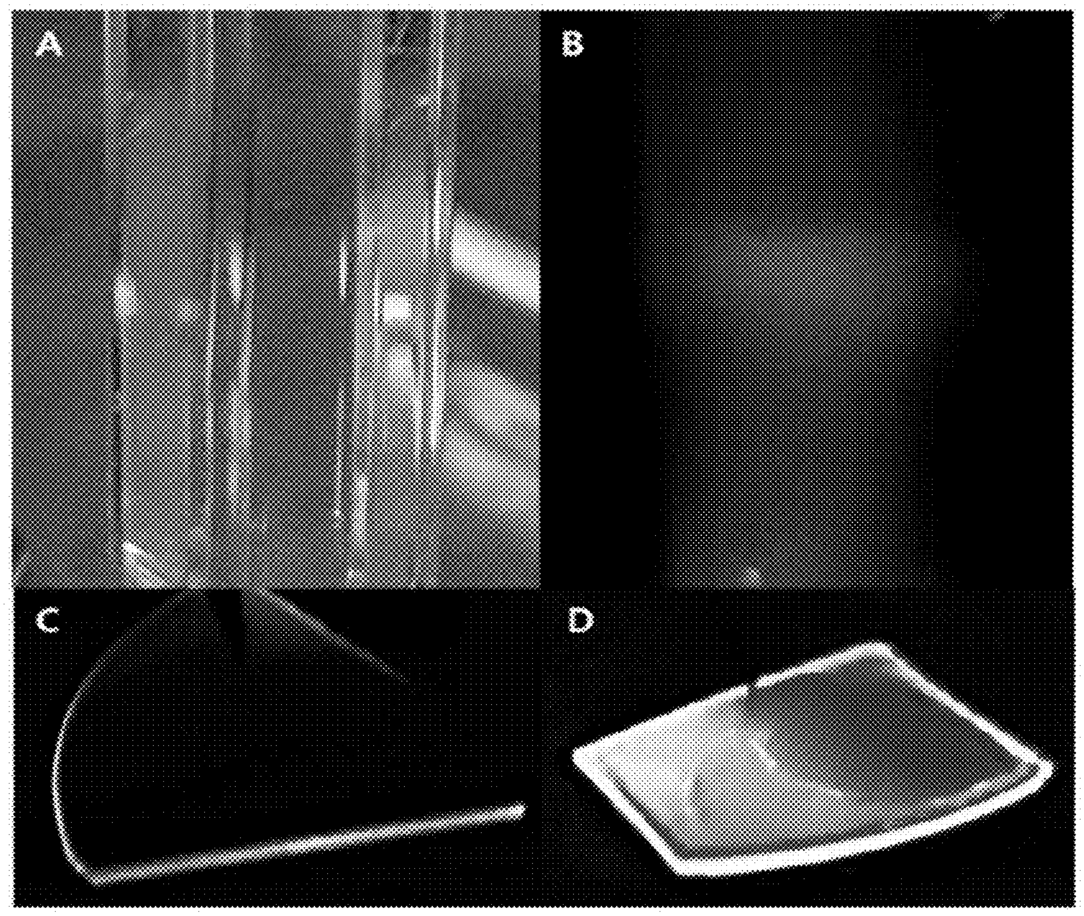
FIG. 3 is a nitride-based MXene light-emitting quantum dot solution and an image obtained by irradiating ultraviolet light onto the MXene light-emitting quantum dot, according to an embodiment of the present invention.
Figure 4:
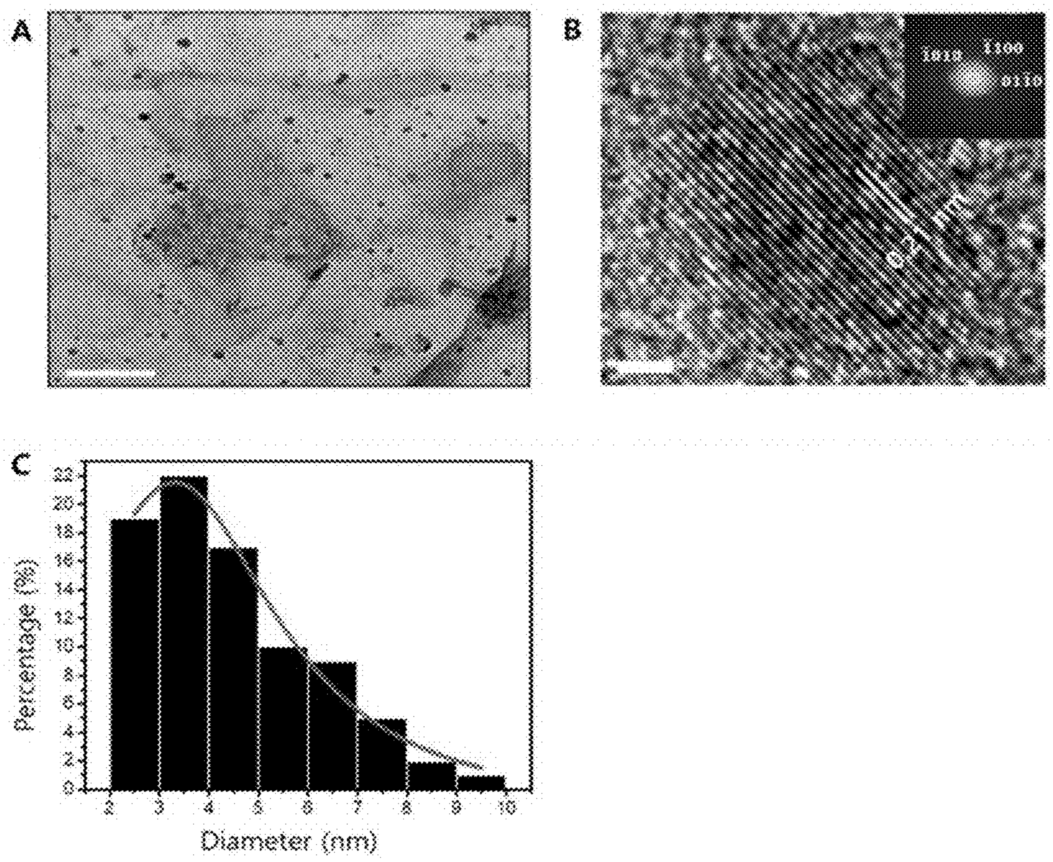
FIG. 4 shows (a) TEM image, (b) HRTEM image, and (c) histogram of MXene quantum dot diameter distribution, of a nitride-based MXene light-emitting quantum dot, according to an embodiment of the present invention.
Figure 5:
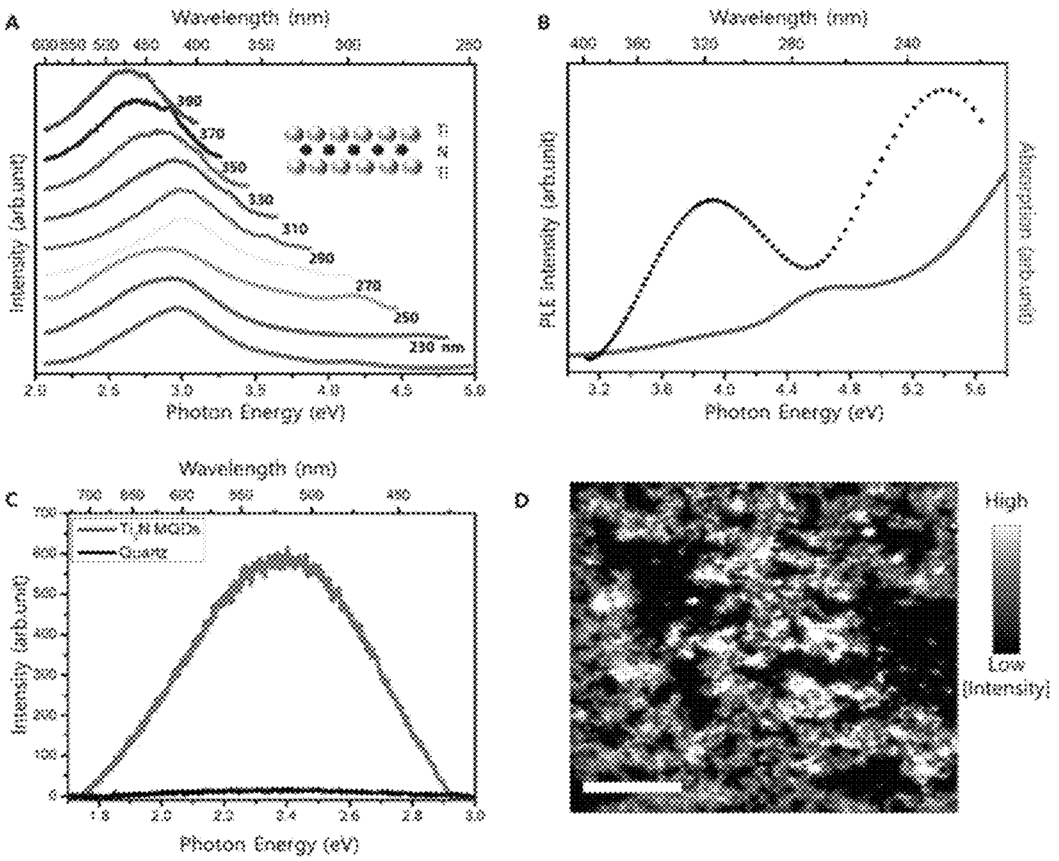
FIG. 5 shows (A) PL spectra of $Ti_2N$ MXene quantum dots, (B) UV-Vis absorption and PLE spectra of $Ti_2N$ MXene quantum dots, (C) PL spectra of thin-film $Ti_2N$ MQDs using 405 nm laser excitation, and (D) epifluorescence image (Scalebar=20 μm) of $Ti_2N$ MXene quantum dots, according to an embodiment of the present invention.

Referring to FIGS. 3 to 5, photoluminescence characteristics and diameter characteristics of a nitride-based MXene light-emitting quantum dot will be described.

FIG. 3 is a nitride-based MXene light-emitting quantum dot solution and an image obtained by irradiating ultraviolet light onto the MXene light-emitting quantum dot, according to an embodiment of the present invention.

In FIG. 5, in the present invention, photoluminescence spectroscopy was applied to confirm the photoluminescence characteristics of the nitride-based MXene light-emitting quantum dot.

Photoluminescence spectroscopy is an analysis method for measuring the emission of energy in the form of light, the energy being absorbed by a transition between unique electronic states in a material after external energy is applied to an atom or a molecule, and the concentration, type of impurity, crystalline state, and bandgap energy may be analyzed through light generated when electrons excited by light irradiation go down to a ground state.

(A) of FIG. 3 shows that a solution was prepared by putting the nitride-based MXene light-emitting quantum dot according to an embodiment of the present invention into 3 ml of liquid, and then added to a quartz container having a size of 12.5 mm×4.5 mm.

(B) of FIG. 3 is a blue photoluminescence phenomenon that could be confirmed when ultraviolet light having a wavelength of 250 nm was irradiated onto the solution of (A) of FIG. 3.

(C) of FIG. 3 is a light-emission image obtained by irradiating 250 nm UV-LED without quantum dots on a quartz substrate.

In addition, (D) of FIG. 3 is a light-emission image obtained by dispersing quantum dots on a quartz substrate and irradiating 250 nm UV-LED.

Therefore, referring to FIG. 3, it could be confirmed that the nitride-based MXene light-emitting quantum dot according to an embodiment of the present invention emitted photoluminescence (PL) by irradiation of ultraviolet light.

FIG. 4 shows (a) TEM image, (b) HRTEM image, and (c) histogram of MXene quantum dot diameter distribution, of a nitride-based MXene light-emitting quantum dot, according to an embodiment of the present invention.

Referring to (A) of FIG. 4, it could be confirmed that the nitride-based MXene light-emitting quantum dot according to an embodiment of the present invention was in the form of a circular particle and maintained crystallinity of $Ti_2N$ MXene as a precursor.

Referring to (B) of FIG. 4, considering that the lattice spacing of one cell is 0.21 nm, it could be confirmed that the nitride-based MXene quantum dot according to an embodiment of the present invention had a diameter of 3 nm.

In addition, referring to (C) of FIG. 4, it could be confirmed that nitride-based MXene light-emitting quantum dots according to an embodiment of the present invention had a diameter of 10 nm or less and had an average diameter of 3 nm, according to a result of the histogram of the MXene quantum dot diameter distribution.

FIG. 5 shows (A) PL spectra of $Ti_2N$ MXene light-emitting quantum dots, (B) UV-Vis absorption and PLE spectra of $Ti_2N$ MXene light-emitting quantum dots, (C) PL spectra of thin-film $Ti_2N$ MQDs using 405 nm laser excitation, and (D) epifluorescence image (Scalebar=20 μm) of $Ti_2N$ MXene quantum dots, according to an embodiment of the present invention.

Referring to (A) of FIG. 5, it could be confirmed that $Ti_2N$ MXene light-emitting quantum dots according to an embodiment of the present invention exhibited PL spectra having various excitation energies.

Specifically, it could be confirmed that the $Ti_2N$ MXene light-emitting quantum dots according to an embodiment of the present invention exhibited PL spectra by light emission for ultraviolet light having a wavelength of 230 nm to 390 nm.

The PL emission peak was observed at about 3.0 eV at an excitation wavelength between 230 nm and 270 nm, and it could be confirmed that as the excitation wavelength increased, red shift gradually occurred.

Referring to (B) of FIG. 5, UV-Vis absorption and PLE spectra of $Ti_2N$ MXene light-emitting quantum dots could be represented by a black curve, and two peaks were observed at 3.9 eV and 5.4 eV, which could coincide with two absorption edges of the absorption spectrum of a red curve.

Each peak of the PLE excitation spectrum represents an energy level contributing to light emission in a light-emitting quantum dot. Therefore, several peaks appearing in the energy region above the bandgap may indicate that there are several quantized energy levels contributing to light emission of quantum dots.

Referring to (C) of FIG. 5, a PL peak was observed at 2.4 eV, and it could be confirmed that it had slightly lower energy than in the case of solution dispersion.

In addition, (D) of FIG. 5 is an image obtained by dispersing $Ti_2N$ MQDs on a quartz substrate and observing distinct PL at 430 nm excitation as indicated in the epifluorescence image of the dispersed MQDs.

Referring to (D) of FIG. 5, it could be confirmed that the $Ti_2N$ quantum dots dispersed on the substrate had slightly reduced luminescence energy compared to solution dispersion.

Therefore, referring to FIG. 5, it could be confirmed that the $Ti_2N$ MXene quantum dots according to the present invention exhibited a photoluminescence phenomenon both in the solution and in the thin film by using a wide range of excitation wavelengths.

According to an embodiment of the present invention, a nitride-based MXene light-emitting quantum dot may be provided.

The nitride-based MXene light-emitting quantum dot has an effect of efficiently generating light emission by increasing the bandgap energy of MXene by inducing a quantum confinement effect by reducing the size of the quantum dot.

The effects of the present invention are not limited to the above-described effects, and it should be understood that the effects include all effects that can be inferred from the configuration of the invention described in the detailed description of the invention or the claims.

The above description of the present invention is intended to provide examples, and it would be understood by those of ordinary skilled in the art that modifications may be easily made into other specific forms without changing technical concept and essential features of the present invention. Therefore, it should be understood that the embodiments described above are only exemplary and are not limited. For example, each component described as a single type may be implemented in a distributed manner, and likewise components described as distributed may be implemented in a combined form.

The scope of the present invention is represented by the claims, and should be interpreted that the meaning and scope of the claims and all the changes or modified forms derived from the equivalents thereof come within the scope of the present invention.

What is claimed is:

1. A nitride-based MXene light-emitting quantum dot comprising a nitride-based MXene quantum dot having a diameter of 10 nm or less, wherein the nitride-based MXene light-emitting quantum dot absorbs ultraviolet light to emit light, and wherein the nitride-based MXene quantum dot comprises titanium nitride ($Ti_2N$), vanadium nitride ($V_2N$), or niobium nitride ($Nb_2N$).

2. The nitride-based MXene light-emitting quantum dot of claim 1, wherein a wavelength of the ultraviolet light is 230 nm to 400 nm.

3. The nitride-based MXene light-emitting quantum dot of claim 1, wherein the nitride-based MXene light-emitting quantum dot is water-soluble.

4. A method of manufacturing a nitride-based MXene light-emitting quantum dot, the method comprising:

manufacturing a nitride-based MXene by treating a nitride-based MAX phase with an acidic solution;

delaminating the nitride-based MXene through ultrasonic treatment; and synthesizing the nitride-based MXene light-emitting quantum dot by performing hydrothermal synthesis on the delaminated nitride-based MXene, wherein the nitride-based MXene light-emitting quantum dot comprises titanium nitride ($Ti_2N$), vanadium nitride ($V_2N$), or niobium nitride ($Nb_2N$).

5. The method of claim 4, wherein, in the manufacturing of the nitride-based MXene, the nitride-based MXene is manufactured by treating the nitride-based MAX phase with the acidic solution.

6. The method of claim 5, wherein, in the manufacturing of the nitride-based MXene, the acidic solution comprises LiF, NaF or KF.

7. The method of claim 4, wherein, in the delaminating of the nitride-based MXene, the ultrasonic treatment is performed at a frequency of 30 kHz to 60 KHz.

8. The method of claim 4, wherein, in the delaminating of the nitride-based MXene, the ultrasonic treatment is performed at a temperature of 30° C. to 50° C.

9. The method of claim 4, wherein, in the synthesizing of the nitride-based MXene light-emitting quantum dot, the hydrothermal synthesis is performed at a temperature of 100° C. to 180° C.

10. The method of claim 4, wherein, in the synthesizing of the nitride-based MXene light-emitting quantum dot, the hydrothermal synthesis is performed at a pressure of $10^{-2}$ Torr to $10^{-4}$ Torr.

* * * * *